United States Patent Office
3,494,932
Patented Feb. 10, 1970

3,494,932
AMINOALKYL SUBSTITUTED ARYL
HYDANTOINS
Herbert Joseph Brabander, Nanuet, N.Y., assignor to
American Cyanamid Company, Stamford, Conn.,
a corporation of Maine
No Drawing. Filed June 26, 1967, Ser. No. 649,011
Int. Cl. C07d 49/32, 57/00; A61k 27/00
U.S. Cl. 260—309.5                        9 Claims

ABSTRACT OF THE DISCLOSURE

Compounds of the class 1 (or 3) tert. aminoalkyl-3 (or 1) aryl hydantoins and method of preparation are described. These compounds are useful for their analgesic and central nervous system (CNS) depressant activity.

SUMMARY OF THE INVENTION

The hydantoins of this invention can be illustrated by the following formula:

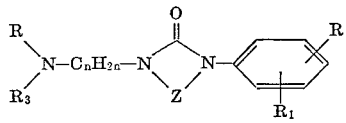

wherein R is halogen or trifluoromethyl and $R_1$ is hydrogen, halogen, or lower alkyl, Z is

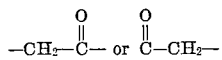

$n$ is the integer 2, 3, or 4; and $R_2$ and $R_3$ are hydrogen, lower alkyl, lower alkenyl, cycloalkyl, aralykyl, lower (cycloalkyl)methyl, and when —$NR_2R_3$ is taken together 1-pyrrolidinyl, lower alkyl-1-pyrrolidinyl, piperidino, lower alkylpiperidino, morpholino, lower alkylmorpholino, hexamethyleneimino, 1-(lower alkyl)-4-piperazinyl, and azabicyclo-[3.2.2]nonan-3-yl; and when —$C_nH_{2n}NR_2R_3$ is taken together (2-pyrrolidinyl)lower alkyl, (3-pyrrolidinyl)lower alkyl, (1-loweralkylpyrrolidinyl)lower alkyl, (1-benzylpyrrolidinyl)lower alkyl,[1-(halobenzyl)pyrrolidinyl]lower alkyl, [1-(lower alkoxybenzyl)pyrrolidinyl] lower alkyl, [1-(lower alkylbenzyl)pyrrolidinyl]lower alkyl, (piperidinyl)lower alkyl, (1-lower alkylpiperidinyl) lower alkyl, (1-benzylpiperidinyl)lower alkyl, [1-(halobenzyl)piperidinyl]lower alkyl, [1-(lower alkoxybenzyl) piperidinyl]lower alkyl, [1-(lower alkylbenzyl)piperidinyl]lower alkyl; and pharmaceutically acceptable acid addition salts thereof.

The free bases of this invention, in general, may be either liquids or solids at room temperature. The free bases are, in general, relatively insolble in water, but soluble in most organic solvents such as lower alkyl alcohols and esters, acetone, chloroform, and the like. These compounds form acid addition salts with strong acid, such as hydrochloric acid, sulfuric acid, nitric acid, and the like. The compounds also form salts with organic acids, as for example, fumaric and maleic acid. Such salts, in general, are soluble in water, ethanol and methanol, but relatively insoluble in benzene, ether, petroleum ether, and the like.

The novel compounds of this invention may be preferably prepared by starting with glycine or a substituted glycine derivative. These are then converted to either substituted 1-aryl hydantoin intermediates such as 1-(m-chlorophenyl)hydantoin by the method described by P. Schwebel, Berichte 10, 2048–9 (1877) or to substituted 3-aryl hydantoin intermediates such as 3-(m-chlorophenyl) hydantoin by the method described by H. Finkbeiner, French Patent 1,389,841, Feb. 19, 1965.

The preferred method of preparing the compounds of the present invention can be illustrated as follows:

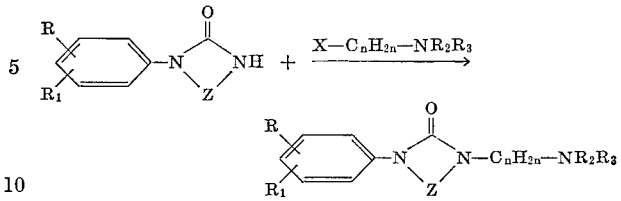

wherein R, $R_1$, $R_2$, $R_3$, Z and $n$ are as defined hereinbefore and X is a reactive halogen, lower alkyl sulfonyloxy or arylsulfonyloxy group. The substituted 1-(or 3)-aryl hydantoin is dissolved in an inert solvent, as for example, benzene, toluene, or diethylene glycol dimethyl ether (diglyme) and reacted with a condensing agent such as sodium hydride and then with an appropriate aminoalkyl derivative. The reaction may be best carried out at temperatures within the range of about 30°–170° C. for a period of from about 30 minutes to 18 hours. The product can be recovered by methods well known in the art and described hereinafter in the examples.

A further method of preparing the persent compounds can be illustrated by the following procedure:

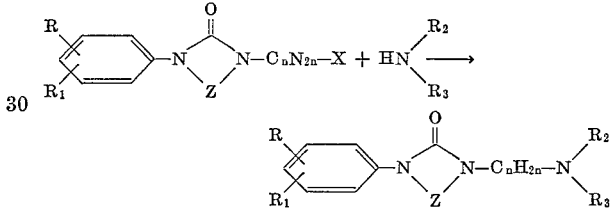

wherein R, $R_1$, $R_2$, $R_3$ and $n$ are as defined above and X is a halogen, alkylsulfonyloxy, or arylsulfonyloxy radical. The reaction takes place when the reagents are contacted in an inert solvent such as ether, tetrahydrofuran, toluene, benzene, and the like and the reagent mixture is maintained within the temperature of from about 30° to 150° C. for a period of about 10 minutes to several hours.

Still another method of preparing the present compounds can be illustrated by the following procedure:

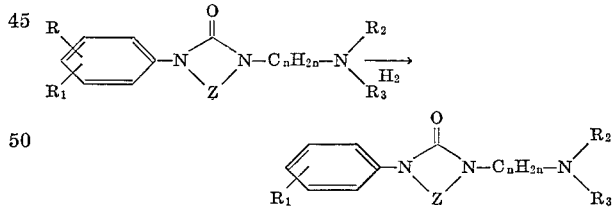

wherein R is a halogen, $R_1$ is trifluoromethyl and $R_2$, $R_3$, Z and $n$ are as defined hereinbefore. The 1 (or 3) aminoalkyl-3 (or 1) haloaryl hydantoin is dissolved in a polar solvent such as water, methanol, ethanol, and the like, in the presence of palladium-on-carbon catalyst. The mixture is shaken for a period of about 30 minutes to 6 hours in a Parr hydrogenator. The product can be recovered by procedures well known in the art and described hereinafter in the examples.

The compounds of the present invention show (CNS) depressant properties. This activity is indicated by several procedures. For example, a test which indicates hypnotic and/or muscle relaxant type activity is represented by the following rod walking test. Groups of 6 mice each are tested for their ability to walk across a horizontal rod in a normal manner after receiving graded intraperitoneal doses of a compound. A median effective dose (RWD) is estimated.

A test which indicates tranquilizing activity is represented by a measure of the reduction in motor activity. One-half this dose is given to a group of 5 mice and a 5 minute count of motor activity is recorded (actophotometer). Counts of ≦250 are considered to indicate a specific reduction (more than two standard deviations) of activity at a dose causing only minimal impairment of neurological function as measured by rod walking ability. Compounds that appear to reduce motor activity (≦250 count) are administered to additional groups of 5 mice at graded doses and tested similarly. The dose (MDD) which causes a 50% reduction of motor activity (a count of 250) is estimated. As a test for toxicity or margin of safety, the compounds that did specifically reduce motor activity are given to 10 mice at a dose of 10× (MDD). The compounds that did not reduce motor activity are given to 10 mice at a dose of 4× (RWD). If more than 50% of the mice die within 24 hours, the compound is rejected for reasons of toxicity or low margin of safety. If less than 50% of the mice die the compound is considered a candidate for further study.

The compounds of this invention also have been found to be active analgesics. The compounds are tested by a modification of the method described by E. Siegmund et al., Proc. Soc. Expt. Biol. Med., 95, 729 (1957). Briefly the test is described as follows: Two mice are administered the test compound, orally, 30 minutes prior to the intraperitoneal injection of 1 mg./kg. phenyl-p-quinone (PPQ). Fifteen minutes later the mice are observed for a period of 3 minutes and the total number of characteristic writhing episodes for both animals is counted and recorded. The mean number of writhes exhibited by 21 pairs of control animals (dosed orally with 2% starch) was 29. For our purposes any compound that reduces the incidence of writhing to 18 or less is considered active in the (PPQ) test, otherwise the compound is rejected.

The products of the present invention as depressants and analgesics can be incorporated in various pharmaceutical forms such as tablets, capsules, pills and so forth, for immediate or sustained release, by combining with suitable carriers. The daily dose may vary from 30 mg. to 900 mg. They may be in the form of dosage units for single therapeutic dose or in small units for multiple dosages or in larger units for division into single doses. Obviously, in addition to the therapeutic compound there may be present excipients, binders, fillers and other therapeutically inert ingredients necessary in the formulation of the desired pharmaceutical preparation.

DETAILED DESCRIPTION

The following specific examples illustrate the preparation of representative compounds of the present invention. Parts are by weight unless otherwise indicated.

EXAMPLE 1

Preparation of 1-(m-chlorophenyl)-3-[2-(ethylmethylamino)ethyl]-hydantoin

A mixture of 1.5 parts of 50% sodium hydride (in mineral oil) and 6.1 parts of 1-(m-chlorophenyl)hydantoin in 200 parts of diglyme is stirred under an atmosphere of nitrogen, heated at reflux temperature for 3 hours, and cooled. A solution of 6 parts of N-(2-chloroethyl)-N-ethyl-N-methylamine in 225 parts of ether is added. The mixture is stirred at room temperature for 2 hours, heated for 1½ hours to distill off the ether, and heated at reflux temperature for 16 hours. The sodium chloride is removed by filtration and the reaction mixture concentrated to remove the solvent. The residue is dissolved in 150 ml. of benzene and washed with water. The benzene layer is dried over magnesium sulfate, filtered and concentrated to recover the desired base or acidified with 14 ml. of 2.8 N ethanolic hydrogen chloride to prepare the hydrochloride salt. The precipitated hydrochloride is filtered and recrystallized from ethanol to yield 1-(m-chlorophenyl)-3-[2-(ethylmethylamino)ethyl]hydantoin hydrochloride, melting point 190–192° C. This compound has (CNS) depressant and analgesic activity.

EXAMPLE II

Preparation of 1-(m-chlorophenyl)-3-(2-diethylaminoethyl)hydantoin

The above compound is obtained by the procedure of Example I when N-(2-chlorethyl)-N,N-diethylamine is substituted for N-(2-chloroethyl)-N-ethyl-N-methylamine. The hydrochloride salt melts at 158–160° C.

EXAMPLE III

Preparation of 1-(m-chlorophenyl)-3-[2-(1-pyrrolidinyl)ethyl]-hydantoin

This compound is obtained when N-(2-chloroethyl)pyrrolidine is substituted for N-(2-chloroethyl)-N-ethyl-N-methylamine in the procedure of Example I. The melting point of the hydrochloride salt is 212–214° C.

EXAMPLE IV

Preparation of 1-(m-chlorophenyl)-3-(2-morpholinoethyl)hydantoin

The above described derivative is obtained when 4-(2-chloroethyl)morpholine is substituted for N-(2-chloroethyl)-N-ethyl-N-methyl-amine in the procedure of Example I. The hydrochloride salt melts at 246–249° C.

EXAMPLE V

Preparation of 3-(m-chlorophenyl)-1-(2-diethylaminoethyl)hydantoin

This compound is obtained when 3-(m-chlorophenyl) hydantoin and N-(2-chloroethyl)-N,N-diethylamine are contacted using the procedure of Example I. The melting point of the hydrochloride salt is 143–145° C. This compound has analgesic and (CNS) depressant activity.

EXAMPLE VI

Preparation of 3-(m-chlorophenyl)-1-[2-(1-pyrrolidinyl)ethyl]-hydantoin

A mixture of 1.3 parts of 50% sodium hydride (in mineral oil) and 5.3 parts of 3-(m-chlorophenyl)hydantoin in 400 parts of benzene is stirred under an atmosphere of nitrogen, heated at reflux temperature for 3 hours and cooled. A solution of 4.3 parts of N-(2-chloroethyl)pyrrolidine in 30 parts of benzene is added. The reaction mixture is stirred at room temperature for 2 hours, and heated at reflux temperature for 16 hours. The precipitate of sodium chloride is removed by filtration. The benzene solution is washed with water, dried over magnesium sulfate, filtered, and acidified with 10 ml. of 3 N ethanolic hydrogen chloride. The hydrochloride salt is filtered, and recrystallized from ethanol to yield 3-(m-chlorophenyl)-1-[2-(1-pyrrolidinyl)ethyl]hydantoin hydrochloride, melting point 191–193° C. This compound has analgesic activity.

EXAMPLE VII

Preparation of 3-(m-chlorophenyl)-1-(2-dimethylaminoethyl)hydantoin

The above compound is obtained when N-(2-chloroethyl)-N,N-dimethylamine is substituted for N-(2-chloroethyl)pyrrolidine in the procedure of Example VI. The hydrochloride salt melts at 227–229° C. This compound shows (CNS) depressant and analgesic activity.

EXAMPLE VIII

Preparation of 3-(m-chlorophenyl)-1-(3-dimethylaminopropyl)hydantoin

This compound is obtained when N-(3-chloropropyl)-N,N-dimethylamine is substituted for N-(2-chloroethyl)pyrrolidine in the procedure of Example VI. The melting point of the hydrochloride salt is 166–168° C.

EXAMPLE IX

Preparation of 3-(m-chlorophenyl)-1-[2-(ethylmethylamino)ethyl]-hydantoin

This derivative is obtained when N-(2-chloroethyl)-N-ethyl-N-methylamine is substituted for N-(2-chloroethyl)pyrrolidine in the procedure of Example VI. The hydrochloride salt melts at 187–189° C. This compound has analgesic activity.

EXAMPLE X

Preparation of 3-(m-chlorophenyl)-1-(2-piperidinoethyl)hydantoin

The above compound is obtained when N-(2-chloroethyl)piperidine is substituted for N-(2-chloroethyl)pyrrolidine in the procedure of Example VI. The hydrochloride salt melts at 210–212° C.

EXAMPLE XI

Preparation of 1-[3-(4-benzyl-1-piperazinyl)propyl]-3-(m-chlorophenyl)hydantoin

This compound is obtained when 1-benzyl-4-(3-chloropropyl)piperazine is substituted for N-(2-chloroethyl)pyrrolidine in the procedure of Example VI. The melting point of the dihydrochloride salt is 253–256° C.

EXAMPLE XII

Preparation of 3-(2-methylaminoethyl)-1-($\alpha,\alpha,\alpha$-trifluoro-m-tolyl)hydantoin A mixture of 3.3 parts of 3-[2-benzylmethylamino)ethyl]-1-($\alpha,\alpha,\alpha$-trifluoro-m-tolyl)hydantoin hydrochloride and 1 part of 10% palladium-on-carbon catalyst in 100 parts of 90% ethanol is shaken in a Parr hydrogenator for 3 hours. The catalyst is filtered off and the reaction mixture is concentrated to remove the solvent. The residue is crystallized by addition of ether, filtered and recrystallized from ethanol to yield 3-(2-methylaminoethyl)-1-($\alpha,\alpha,\alpha$-trifluoro-m-tolyl)hydantoin hydrochloride.

EXAMPLE XIII

Preparation of 3-[2-(benzylmethylamino)ethyl]-1-(m-chlorophenyl)hydantoin

A mixture of 1.2 parts of 50% sodium hydride (in mineral oil) and 5 parts of 1-(m-chlorophenyl)hydantoin in 150 parts of diglyme is stirred under a nitrogen atmosphere, heated at reflux temperature for 2 hours and cooled. A solution of 4.3 parts of N-benzyl-N-(2-chloroethyl)-N-methylamine in 200 parts of benzene is added and the mixture is heated at reflux temperature for 16 hours. The sodium chloride is filtered off and the reaction mixture is concentrated to remove the solvents. The residue is crystallized by trituration in hexane and filtered. The crude base is recrystallized from ethanol by the addition of hexane, melting point 73–75° C. The base is dissolved in 10 ml. of ethanol and converted to the hydrochloride salt by the addition of 1.2 equivalents of 3 N ethanolic hydrogen chloride. The precipitated hydrochloride is filtered and recrystallized from ethanol by the addition of ether to yield 3-[2-(benzylmethylamino)ethyl]-1-(m-chlorophenyl)hydantoin hydrochloride, melting point 170–172° C.

EXAMPLE XIV

Preparation of 3-[(1-benzyl-3-pyrrolidinyl)methyl]-1-(m-chlorophenyl)hydantoin

A mixture of 1.2 parts of 50% sodium hydride (in mineral oil) and 5 parts of 1-(m-chlorophenyl)hydantoin in 150 parts of diglyme is stirred under a nitrogen atmosphere, heated at reflux temperature for 2 hours and cooled. A solution of 5 parts of 1-benzyl-3-chloromethylpyrrolidine in 50 parts of diglyme is added and the mixture is heated for 19 hours at reflux temperature and filtered. The reaction mixture is concentrated to remove the solvent. The residual oil is vacuum distilled for removal of unreacted 1-benzyl-3-chloromethylpyrrolidine. The pot residue is dissolved in acetone and treated with a solution of 1 equivalent of maleic acid in acetone. The acetone is distilled off and the crude maleate salt is crystallized by trituration in ether. The product is filtered and recrystallized from ethanol to yield 3-[(1-benzyl-3-pyrrolidinyl)methyl]-1-(m-chlorophenyl)hydantoin maleate, melting point 154–156° C. This compound has (CNS) depressant activity.

EXAMPLE XV

Preparation of 1-[2-(benzylmethylamino)ethyl]-3-(m-chlorophenyl)hydantoin

This compound is obtained when 3-(m-chlorophenyl)hydantoin is contacted with N-benzyl-N-(2-chloroethyl)-N-methylamine in the procedure of Example XIV. The maleate salt melts at 91–94° C.

EXAMPLE XVI

Preparation of 1-[2-(allylcyclohexylamino)ethyl]-3-(m-chlorophenyl)hydantoin

This compound is obtained when N-allyl-N-(2-chloroethyl)-N-cyclohexylamine is substituted for N-(2-chloroethyl)pyrrolidine in the procedure of Example VI.

EXAMPLE XVII

Preparation of 1-(p-bromophenyl)-3-[3-(cyclopropylmethylmethylamino)propyl]hydantoin The above compound is obtained when 1-(p-bromophenyl)hydantoin is treated with N-(3-chloropropyl)-N-cyclopropylmethyl-N-methylamine in the procedure of Example I.

EXAMPLE XVIII

Preparation of 3-(m-chlorophenyl)-1-[4-(3-methyl-1-pyrrolidinyl)butyl]hydantoin

This derivative is obtained when 1-(4-chlorobutyl)-3-methylpyrrolidine is substituted for N-(2-chloroethyl)pyrrolidine in the procedure of Example VI.

EXAMPLE XIX

Preparation of 3-(3-chloro-5-methylphenyl)-1-[2-(4-ethylpiperidino)ethyl]hydantoin When 3-(3-chloro-5-methylphenyl)hydantoin is contacted with 1-(2-chloroethyl)-4-ethylpiperidine following the procedure of Example VI, the above compound is obtained.

EXAMPLE XX

Preparation of 1-(p-bromophenyl)-3-[3-(2-methylmorpholino)propyl]hydantoin

This derivative is obtained when 1-(p-bromophenyl)hydantoin is treated with 4-(3-chloropropyl)-2-methylmorpholine using the procedure of Example I.

EXAMPLE XXI

Preparation of 3-(2-hexamethyleneiminoethyl)-1-($\alpha,\alpha,\alpha$-trifluoro-m-tolyl)hydantoin When 1-($\alpha,\alpha,\alpha$-trifluoro-m-tolyl)hydantoin and N-(2-chloroethyl)hexamethyleneimine are reacted together by the procedure of Example I, this compound is obtained.

EXAMPLE XXII

Preparation of 3-(o-fluorophenyl)-1-[2-(4-methyl-1-piperazinyl)ethyl]hydantoin

The above compound is obtained when 3-(o-fluorophenyl)hydantoin is contacted with 1-(2-chloroethyl)-4-methylpiperazine in the procedure of Example VI.

EXAMPLE XXIII

Preparation of 1-[2-(azabicyclo[3.2.2]nonan-3-yl)ethyl]-3-(m-chlorophenyl)hydantoin This compound is obtained when 2-(azabicyclo[3.2.2]nonan-3-yl)ethyl chloride is substituted for N-(2-chloroethyl)pyrrolidine in the procedure of Example VI.

EXAMPLE XXIV

Preparation of 3-[(2-pyrrolidinyl)methyl]-1-(α,α,α-trifluoro-p-tolyl)hydantoin

The above compound is obtained when 3-[(1-benzyl-2-pyrrolidinyl)methyl] - 1 - (α,α,α-trifluoro-p-tolyl)hydantoin is reduced by the procedure of Example XII.

EXAMPLE XXV

Preparation of 3-[2-(3-pyrrolidinyl)ethyl]-1-(α,α,α-trifluoro-p-tolyl)hydantoin

When 3-[2-(1-benzyl-3-pyrrolidinyl)ethyl]-1-(α,α,α-trifluoro-p-tolyl)hydantoin is reduced by the procedure of Example XII, this compound is obtained.

EXAMPLE XXVI

Preparation of 3-(p-chlorophenyl)-1-[(1-ethyl-3-pyrrolidinyl)-methyl]hydantoin

The above compound is obtained when 3-(p-chlorophenyl)hydantoin is treated with 3-chloromethyl-1-ethylpyrrolidine in the procedure of Example VI.

EXAMPLE XXVII

Preparation of 1-[(1-m-chlorobenzyl-3-pyrrolidinyl)methyl]-3-(m-chlorophenyl)hydantoin This compound is obtained when 1-m-chlorobenzyl-3-chloromethylpyrrolidine is contacted with 3-(m-chlorophenyl)hydantoin in the procedure of Example XIV.

EXAMPLE XXVIII

Preparation of 3-[2-(1-p-bromobenzyl-3-pyrrolidinyl)ethyl]-1-(o-chlorophenyl)hydantoin When 1-p-bromobenzyl-3-(2-chloroethyl)pyrrolidine and 1-(o-chlorophenyl)hydantoin are reacted together by the procedure of Example XIV, this derivative is obtained.

EXAMPLE XXIX

Preparation of 1-(m-bromophenyl)-3-[(1-m-methoxybenzyl-3-pyrrolidinyl)methyl]hydantoin When 1-m-methoxybenzyl-3-chloromethylpyrrolidine is treated with 1-(m-bromophenyl)hydantoin following the procedure of Example XIV, the above compound is obtained.

EXAMPLE XXX

Preparation of 3-(m-chlorophenyl)-1-[2-(1-o-xylyl-3-pyrrolidinyl)ethyl]hydantoin The above compound is obtained when 3-(m-chlorophenyl)hydantoin is contacted with 3-(2-chloroethyl)-1-o-xylylpyrrolidine in the procedure of Example XIV.

EXAMPLE XXXI

Preparation of 3-[(3-piperidinyl)methyl]-1-(α,α,α-trifluoro-p-tolyl)hydantoin

This derivative is obtained when 3-[(1-benzyl-3-piperidinyl)methyl]-1-(α,α,α-trifluoro-p-tolyl)hydantoin is reduced by the procedure of Example XII.

EXAMPLE XXXII

Preparation of 3-(m-chlorophenyl)-1-[(1-methyl-3-piperidinyl)methyl]hydantoin

This compound is obtained when N-(2-chloroethyl)pyrrolidine is replaced by 1-methyl-3-chloromethylpiperidine in the procedure of Example VI.

EXAMPLE XXXIII

Preparation of 3-[(1-benzyl-3-piperidinyl)methyl]-1-(m-chlorophenyl)hydantoin

When 1-benzyl-3-chloromethylpiperidine is substituted for 1-benzyl-3-chloromethylpyrrolidine in the procedure of Example XIV, the above compound is obtained.

EXAMPLE XXXIV

Preparation of 1-[2-(1-p-chlorobenzyl-3-piperidinyl)ethyl]-3-(p-fluorophenyl)hydantoin When 3-(p-fluorophenyl)hydantoin and 1-p-chlorobenzyl-3-(2-chloroethyl)piperidine are reacted together by the procedure of Example XIV this derivative is obtained.

EXAMPLE XXXV

Preparation of 3-(3,4-dichlorophenyl)-1-[(1-m-fluorobenzyl-2-piperidinyl)methyl]hydantoin The above compound is obtained when 3-(3,4-dichlorophenyl)hydantoin is contacted with 2-chloromethyl-1-m-fluorobenzylpiperidine in the procedure of Example XIV.

EXAMPLE XXXVI

Preparation of 1-(m-chlorophenyl)-3-[2-(1-p-ethoxybenzyl-2-piperidinyl)ethyl]hydantoin This derivative is obtained when 1-benzyl-3-chloromethylpyrrolidine is replaced by 2-(2-chloroethyl)-1-p-ethoxybenzylpiperidine in the procedure of Example XIV.

EXAMPLE XXXVII

Preparation of 3-(m-bromophenyl)-1-[2-(1-m-ethylbenzyl-2-piperidinyl)ethyl]hydantoin When 3-(m-bromophenyl)hydantoin and 2-(2-chloroethyl)-1-m-ethylbenzyl piperidine are reacted together by the procedure of Example XIV, the above compound is obtained.

EXAMPLE XXXVIII

Preparation of 3-(3-chloro-4-methylphenyl)-1-(2-diethylaminoethyl)hydantoin

This compound is obtained when 3-(3-chloro-4-methylphenyl)hydantoin is treated with N-(2-chloroethyl)-N,N-diethylamine in the procedure of Example VI.

EXAMPLE XXXIX

Preparation of 1-[(1-m-chlorobenzyl-3-pyrrolidinyl)methyl]-3-(2,6-dichlorophenyl)hydantoin The above compound is obtained when 1-m-chlorobenzyl-3-chloromethylpyrrolidine is contacted with 3-(2,6-dichlorophenyl)hydantoin in the procedure of Example XIV.

EXAMPLE XL

Preparation of 3-[2-(benzylmethylamino)ethyl]-1-(α,α,α-trifluoro-m-tolyl)hydantoin This derivative is obtained when 1-(m-chlorophenyl)hydantoin is replaced by 1-(α,α,α-trifluoro-m-tolyl)hydantoin in the procedure of Example XIII.

I claim:

1. A hydantoin selected from the group consisting of the formula:

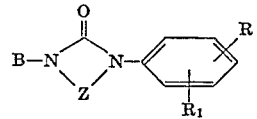

wherein R is selected from the group consisting of halogen and trifluoromethyl; $R_1$ is selected from the group consisting of hydrogen, halogen, and lower alkyl; Z is selected from the group consisting of $$-CH_2-\overset{O}{\underset{\|}{C}}-\quad\text{and}\quad-\overset{O}{\underset{\|}{C}}-CH_2-$$

B is selected from the group consisting of (a)

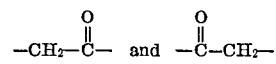

$n$ is the integer 2, 3, or 4; $R_2$ and $R_3$ are selected from the group consisting of hydrogen, lower alkyl, lower alkenyl, cyclohexyl, cyclopropylmethyl and benzyl; and when —NR$_2$R$_3$ is taken together it is selected from the group consisting of 1-pyrrolidinyl, lower alkyl-1-pyrrolidinyl, piperidino, lower alkylpiperidino, morpholino, lower alkylmorpholino, hexamethyleneimino, 1-(lower alkyl)-4-piperazinyl, and azabicyclo[3.2.2]nonan-3-yl; and (b) Het-lower alkylene, wherein Het is selected from the group consisting of 2-pyrrolidinyl, 3-pyrrolidinyl, 1-lower alkylpyrrolidinyl, 1-benzylpyrrolidinyl, 1-halobenzylpyrrolidinyl, 1 - lower alkoxybenzylpyrrolidinyl, 1 - lower alkylbenzylpyrrolidinyl, piperidinyl, 1 - lower alkylpiperidinyl, 1-benzylpiperidinyl, 1-halobenzylpiperidinyl, 1-lower alkoxybenzylpiperidinyl and 1-lower alkylbenzylpiperidinyl; and pharmaceutically acceptable acid addition salts thereof.

2. The hydantoin according to claim 1: 1-(m-chlorophenyl)-3-[2-(ethylmethylamino)ethyl]hydantoin.

3. The hydantoin according to claim 1: 1-(m-chlorophenyl)-3-[2-(1-pyrrolidinyl)ethyl]hydantoin.

4. The hydantoin according to claim 1: 3-[(1-benzyl-3-pyrrolidinyl)methyl]-1-(m-chlorophenyl)hydantoin.

5. The hydantoin according to claim 1: 1-[2-(benzylmethylamino)ethyl]-3-(m-chlorophenyl)hydantoin.

6. The hydantoin according to claim 1: 3-(m-chlorophenyl-1-[2-(1-pyrrolidinyl)ethyl]hydantoin.

7. The hydantoin according to claim 1: 3-(m-chlorophenyl)-1-(2-diethylaminoethyl)hydantoin.

8. The hydantoin according to claim 1: 3-(m-chlorophenyl)-1-(2-dimethylaminoethyl)hydantoin.

9. The hydantoin according to claim 1: 3-(m-chlorophenyl)-1-[2-(ethylmethylamino)ethyl]hydantoin.

References Cited

UNITED STATES PATENTS

| | | |
|---|---|---|
| 3,134,663 | 5/1964 | Kroll _____ 260—309.5 |
| 3,196,152 | 7/1965 | Wright et al. |
| 3,201,404 | 8/1965 | Ruschig et al. |

FOREIGN PATENTS

38/13,386   9/1960   Japan.

OTHER REFERENCES

Kawahara: Chem. Abst., vol. 58, columns 6921–22 (1963).

Winstead et al.: Chem. Abst., vol. 62, column 5268 (1965).

HENRY R. JILES, Primary Examiner

NATALIE TROUSOF, Assistant Examiner

U.S. Cl. X.R.

260—247.1, 247.2, 268, 293.4; 424—248, 250, 267, 273